(12) United States Patent
Hatfield

(10) Patent No.: US 9,216,410 B2
(45) Date of Patent: Dec. 22, 2015

(54) SYSTEMS AND METHODS FOR USING PD$^{1+}$ IN A TWC

(71) Applicant: Randal L. Hatfield, Port Hueneme, CA (US)

(72) Inventor: Randal L. Hatfield, Port Hueneme, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 13/912,018

(22) Filed: Jun. 6, 2013

(65) Prior Publication Data

US 2014/0364303 A1    Dec. 11, 2014

(51) Int. Cl.

| | |
|---|---|
| *B01J 27/224* | (2006.01) |
| *B01J 23/00* | (2006.01) |
| *B01J 23/02* | (2006.01) |
| *B01J 23/08* | (2006.01) |
| *B01J 23/10* | (2006.01) |
| *B01J 23/32* | (2006.01) |
| *B01J 23/40* | (2006.01) |
| *B01J 23/42* | (2006.01) |
| *B01J 23/44* | (2006.01) |
| *B01J 23/58* | (2006.01) |
| *B01J 21/04* | (2006.01) |
| *B01J 23/89* | (2006.01) |
| *B01J 23/62* | (2006.01) |
| *B01J 23/648* | (2006.01) |
| *B01J 23/652* | (2006.01) |
| *B01J 23/656* | (2006.01) |
| *B01J 37/02* | (2006.01) |
| *B01D 53/94* | (2006.01) |

(52) U.S. Cl.
CPC .......... *B01J 23/8913* (2013.01); *B01D 53/945* (2013.01); *B01J 23/002* (2013.01); *B01J 23/62* (2013.01); *B01J 23/6484* (2013.01); *B01J 23/6522* (2013.01); *B01J 23/6562* (2013.01); *B01J 37/0215* (2013.01); *B01J 37/0244* (2013.01); *B01D 2255/1023* (2013.01); *B01D 2255/2045* (2013.01); *B01D 2255/2063* (2013.01); *B01D 2255/2073* (2013.01); *B01D 2255/20707* (2013.01); *B01D 2255/20715* (2013.01); *B01D 2255/20723* (2013.01); *B01D 2255/20738* (2013.01); *B01D 2255/20776* (2013.01); *B01D 2255/20784* (2013.01); *B01D 2255/402* (2013.01); *B01D 2255/908* (2013.01); *B01J 2523/00* (2013.01)

(58) Field of Classification Search
USPC ......... 502/178, 303, 305, 308, 309, 311–313, 502/324, 326–328, 333, 339, 349, 353, 355, 502/439, 525
See application file for complete search history.

(56) References Cited

U.S. PATENT DOCUMENTS 5,232,357 A * 8/1993 Dalla Betta et al. ............. 431/7
5,977,017 A * 11/1999 Golden ......................... 502/302

(Continued)

*Primary Examiner* — Cam N. Nguyen
(74) *Attorney, Agent, or Firm* — Barnes & Thornburg LLP; Edward F. Behm, Jr.; Thomas J. McWilliams

(57) ABSTRACT

Stabilized palladium (+1) compounds to mimic rhodium's electronic configuration and catalytic properties are disclosed. Palladium (+1) compounds may be stabilized in perovskite or delafossite structures and may be employed in Three-Way Catalysts (TWC) for at least the conversion of HC, CO and NOx, in exhaust gases. The TWC may include a substrate, a wash-coat and, a first impregnation layer, a second impregnation layer and an over-coat. The second impregnation layer and the over-coat may include palladium (+1) based compounds as catalyst.

20 Claims, 5 Drawing Sheets

(56) References Cited

U.S. PATENT DOCUMENTS

| | | | |
|---|---|---|---|
| 6,352,955 B1* | 3/2002 | Golden | 502/302 |
| 6,372,686 B1* | 4/2002 | Golden | 502/302 |
| 6,531,425 B2* | 3/2003 | Golden | 502/302 |
| 6,556,423 B2* | 4/2003 | Konaka et al. | 361/321.2 |
| 7,048,360 B2* | 5/2006 | Kanno et al. | 347/68 |
| 7,071,141 B2* | 7/2006 | Gandhi et al. | 502/302 |
| 7,514,055 B2* | 4/2009 | Golden | 423/213.2 |
| 7,718,562 B2* | 5/2010 | Gandhi et al. | 502/66 |
| 7,964,167 B2* | 6/2011 | Kim et al. | 423/213.2 |
| 8,226,915 B2* | 7/2012 | Qi et al. | 423/213.2 |
| 8,685,352 B2* | 4/2014 | Golden et al. | 423/213.2 |
| 2003/0198582 A1* | 10/2003 | Golden | 423/213.2 |
| 2006/0223694 A1* | 10/2006 | Gandhi et al. | 502/60 |
| 2006/0273367 A1* | 12/2006 | Wang | 257/295 |
| 2008/0236723 A1* | 10/2008 | Nonaka et al. | 156/89.14 |
| 2009/0324468 A1* | 12/2009 | Golden et al. | 423/210 |
| 2010/0209326 A1* | 8/2010 | Gandhi et al. | 423/239.1 |
| 2011/0070139 A1* | 3/2011 | Kim et al. | 423/239.1 |
| 2011/0076212 A1* | 3/2011 | Schmieg et al. | 423/213.2 |
| 2012/0180453 A1* | 7/2012 | Blint et al. | 60/274 |

* cited by examiner

US 9,216,410 B2

SYSTEMS AND METHODS FOR USING $PD^{1+}$ IN A TWC

CROSS-REFERENCE TO RELATED APPLICATIONS

N/A

BACKGROUND

1. Technical Field

This disclosure relates generally to catalytic converters, more particularly, to the use of stabilized palladium (+1) as a catalyst.

2. Background Information

Emission standards for unburned contaminants, such as hydrocarbons (that cause adverse health effects), carbon monoxide (which reduces oxygen delivery within the body) and nitrogen oxide (that produces smog), continue to become more stringent. In order to meet such standards, three-way catalysts (TWC) are located in the exhaust gas line of internal combustion engines. Such catalysts promote the oxidation of unburned hydrocarbons and carbon monoxide as well as the reduction of nitrogen oxides to nitrogen in the exhaust gas stream.

Ensuring that the materials of the conversion catalysts are available and active to convert exhaust gas throughout the life of the catalyst is an on-going goal. It is most common to find tri-metallic catalyst systems for controlling HC, CO and NOx emissions, but the catalysts cost is high. Additionally, because of the presence of two different group VIB metal compounds in tri-metallic catalyst, the production process is more complicated. Moreover, it is difficult to reclaim the metals from the spent (or used) catalysts, because it is difficult to separate two different group VIB metals with a high yield.

TWC Catalysts typically contain three platinum group metals: platinum, palladium, and rhodium. Platinum and palladium are generally used for CO and hydrocarbon conversion, while rhodium is known for its excellent performance for the reduction of nitric oxide. However, the price of rhodium can be very high and has a tendency to fluctuate with time. Palladium also can reduce NOx; however, it is generally not as effective as rhodium.

Because of its exceptional nitric oxide reduction performance, rhodium is the most common element among the PGMs employed as TWC, but this PGM has the most volatile price.

Therefore, there is a continuing need to provide a TWC that provides sufficient conversion so that stringent HC, NOx, and CO emission limits can be achieved cost-effectively, minimizing the amount of PGM metals required, specially Rh, as the PGM metals are expensive.

SUMMARY

An aspect of the current disclosure is the application of palladium with a formal oxidation state of one ($Pd^{1+}$) in a TWC. Of the platinum group metals (PGM), palladium (Pd) is of particular interest for gasoline engine emission control because of its lower cost relative to platinum (Pt) and rhodium (Rh), its greater availability relative to rhodium and its performance advantages relative to other platinum group metals under certain operating conditions. Stabilized palladium (I) catalysts can provide the benefits of the rhodium without using rhodium, because of its similar electron configuration.

The use of palladium has price and availability benefits. The cost advantages of a palladium-only catalyst article are particularly important for meeting exhaust treatment requirements. There is still a need for a palladium-only TWC with improved durability and performance in the harsh environment. The TWC of the present disclosure may be suitable for the purification of exhaust gases at moderate temperatures below 900° C.

The TWC may contain a first layer formed on a carrier substrate, where the first layer may be called wash-coat, and a second layer formed over the wash-coat, where the second that may be called over-coat. The wash-coat layer may include temperature stable high surface area oxides and oxygen storage materials, and may be impregnated once or multiple times with soluble inorganic salts containing the palladium and the elements necessary for palladium (+1) phase formation. The oxygen storage material may be about 0% wt to 80% wt of the wash-coat layer and the impregnated wash-coat may include a palladium in an oxidation state of (+1) component in a perovskite structure in an amount of about 1 $g/ft^3$-100 $g/ft^3$ of palladium (+1), where the palladium component is substantially the only platinum group metal component.

According to aspects of the present disclosure, the substrate may be a honeycomb ceramic structure, where the substrate may have a plurality of channels and a suitable porosity and offers a three-dimensional support for the wash-coat. Suitable materials for the substrate may include metallic supports, as well as, ceramic supports made from cordierite, mullite, SiC, SiN, or similar shock and thermally resistant materials.

In one embodiment, the catalyst article exhibits improved durability and NOx performance relative to known palladium-only TWC.

Numerous other aspects, features and advantages of the present disclosure may be made apparent from the following detailed description, taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the invention. In the figures, reference numerals designate corresponding parts throughout the different views.

DETAILED DESCRIPTION

Figure 1:
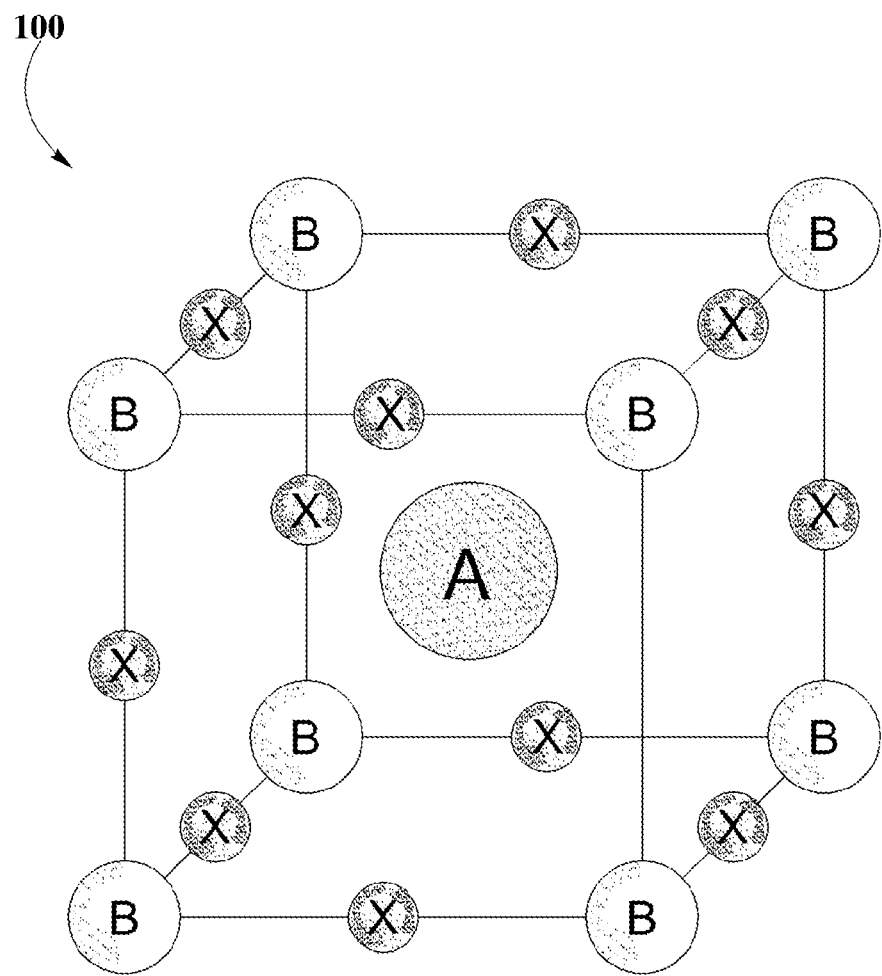
FIG. 1 illustrates a perovskite structure of a $Pd^{1+}$ compound for palladium-only TWCs, according to an embodiment.

Disclosed here is $Pd^{1+}$ in a TWC, according to an embodiment.

The present disclosure is here described in detail with reference to embodiments illustrated in the drawings, which form a part here. In the drawings, which are not necessarily to scale or to proportion, similar symbols typically identify similar components, unless context dictates otherwise. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms have the following definitions:

"Complexing agent" refers to a substance capable of promoting the formation of a complex.

"Exhaust" refers to the discharge of gases, vapor, and fumes including hydrocarbons, nitrogen oxide, and/or carbon monoxide.

"Impregnation" refers to the process of incorporating a liquid solution into a porous material, causing the penetration of the solution into the material.

"Palladium-only TWC" refers to a TWC where palladium is the only-PGM used as catalyst.

"Wash-coat" refers to at least one coating including at least one oxide solid that may be deposited on a substrate.

"Over-coat" refers to at least one coating including one or more oxide solids or metals that may be deposited on at least one wash-coat or impregnation layer.

DESCRIPTION OF THE DRAWINGS

An oxidation catalyst in conjunction with a sufficiently lean exhaust (containing excess oxygen) results in the oxidation of residual HC and CO to small amounts of carbon dioxide ($CO_2$) and water ($H_2O$), where equations (1) and (2) take place.

$$2CO + O_2 \rightarrow 2CO_2 \qquad (1)$$

$$2C_mH_n + (2m + \tfrac{1}{2}n)O_2 \rightarrow 2mCO_2 + nH_2O \qquad (2)$$

Although dissociation of NO into its elements is thermodynamically favored, under practical lean conditions this could not be done. The most active surfaces for NO dissociation are metallic, and dissociative adsorption of NO, equation (3), can be followed by rapid desorption of N2, equation (4). However, oxygen atoms remain strongly adsorbed on the catalyst surface, and soon coverage by oxygen is complete, preventing further adsorption of NO, thus its dissociation is halted. Effectively, the surface is poisoned by adsorbed oxygen atoms, and under the prevailing conditions they can only be removed through a reaction with a reductant, for example with hydrogen, as illustrated in equation (5), or with CO as in equation (6), to provide a clean active surface for further NO dissociation.

$$2NO \rightarrow 2N_{ads} + 2O_{ads} \qquad (3)$$

$$N_{ads} + N_{ads} \rightarrow N_2 \qquad (4)$$

$$O_{ads} + H_2 \rightarrow H_2O \qquad (5)$$

$$O_{ads} + CO \rightarrow CO_2 \qquad (6)$$

It was found that the most catalytically active metals for this process were rhodium and ruthenium. It was also found that palladium in the formal oxidation state of +1 ($Pd^{1+}$) can provide similar benefits as rhodium. This may be the result of the same electron count of Pd (1+) and metallic rhodium.

Palladium has primarily two formal oxidation states: $Pd^0$ (metallic) and $Pd^{+2}$, but by stabilizing Pd in the formal oxidation state of (+1) for palladium only formulations, more cost effective TWCs can be achieved.

In order to stabilize palladium in the oxidation state of (+1), palladium based compounds with perovskite or delafossite structure may be used in the fabrication of palladium-only TWC. It may be preferred to have mixed perovskites or delafossites to maintain the phases of the composition stabilized for the production of the TWC.

FIG. 1 illustrates a perovskite structure 100 of a $Pd^{1+}$ compound for a TWC where the palladium (+1) included is capable of mimicking the catalytic properties of rhodium. Other non-PGM metals might be added in different layers of the TWC. Perovskite structure 100 configuration may be denoted as $ABX_3$. Where A may include $Pd^{1+}$, $Pd^{1+}$/Ca, La; B may include Ti/Nb, Nb, Zr, Mn, Ta, V, Ti, W and mixture thereof and other stable (+5) cations; and X may be O. Other examples of compounds in perovskite structure 100 may be $Pd^{1+}Nb^{5+}O_3$, $Pd^{1+}Ta^{5+}O_3$, $Pd^{1+}V^{5+}O_3$, $Pd^{1+}{}_{0.5}Ca^{2+}{}_{0.5}Ca^{2+}{}_{0.5}Ti^{4+}{}_{0.50}Nb^{5+}{}_{0.5}O_3$, $Pd^{1+}{}_uCa^{2+}{}_vD^{4+}{}_wE^{5+}{}_xO_y$, where u+v=1, w+x=1, u*1+v*2+w*4+x*5=6 when y=3. 'y' may be less than 3, but typically greater than 2.7. 'D' and 'E' are respectively elements exhibiting a stable formal charge of (IV) and (V). Partial calcium substitution may be made be with Mg and Sr.

Figure 3:
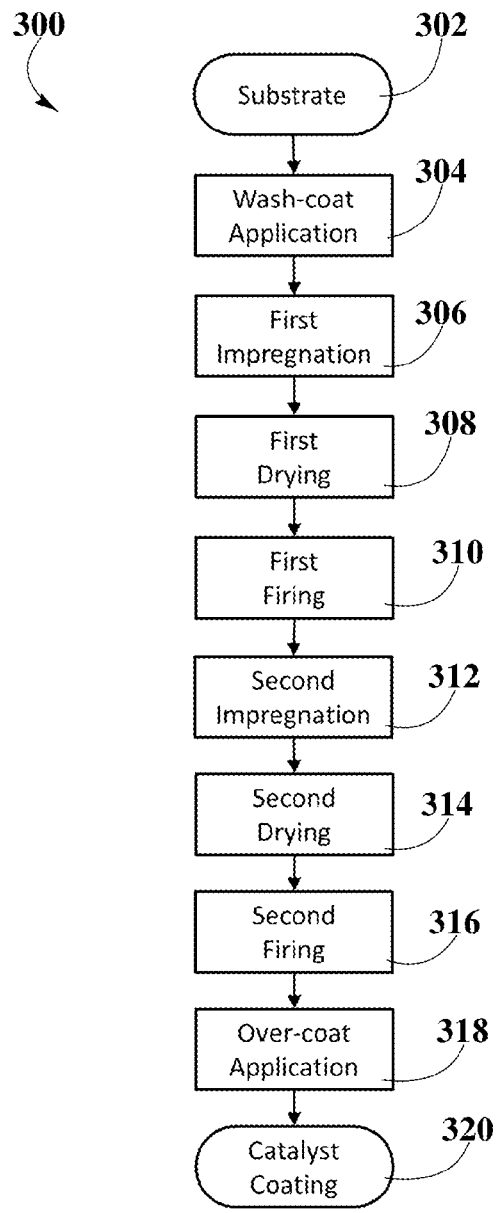
FIG. 3 is a flowchart of method for producing a TWC with $Pd^{1+}$, according to an embodiment.

Compounds having perovskite structure 100 may be used in the method for producing a TWC in FIG. 3.

Figure 2:
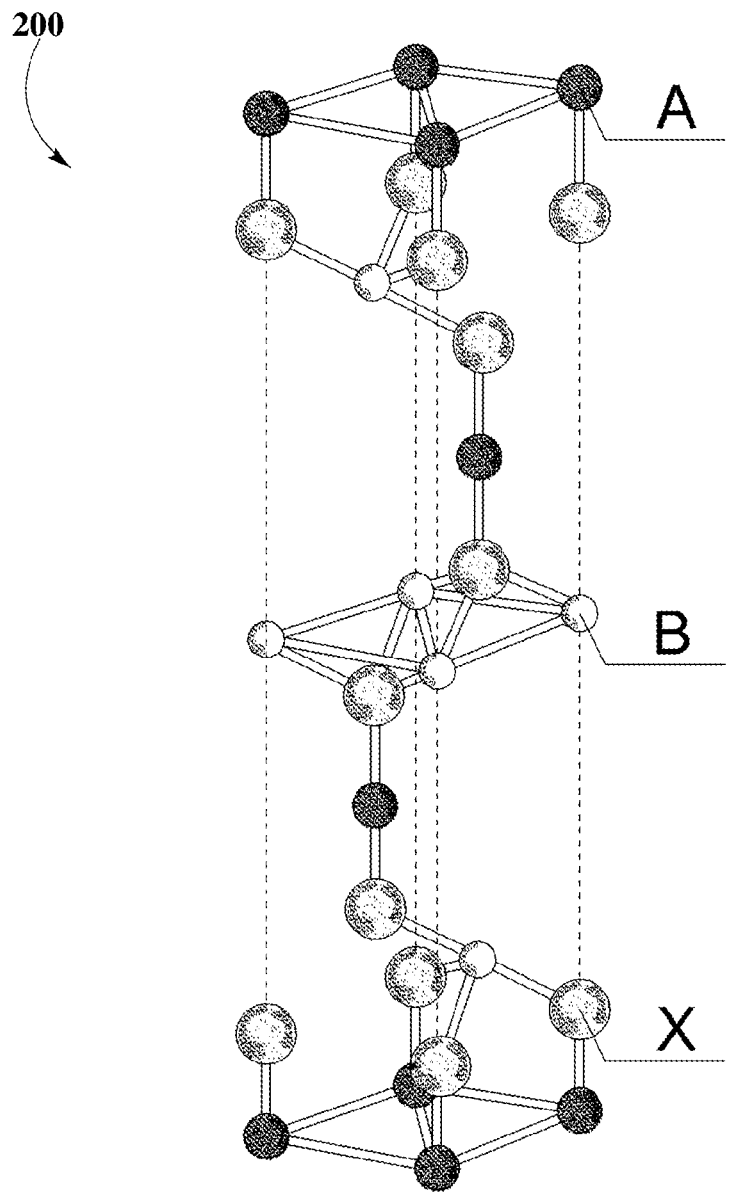
FIG. 2 illustrates a delafossite structure of a $Pd^{1+}$ compound for palladium-only TWCs, according to an embodiment.

FIG. 2 illustrates a unit-cell of delafossite structure 200 of a $Pd^{1+}$ compound for a TWC where the palladium (+1) included is capable of mimicking the catalytic properties of Rhodium. Other non-PGM metals might be added in different layers of the TWC. Delafossite structure 200 configuration may be denoted as $ABX_2$. Where A may be $Pd^{1+}$, B may include Sc, Cr, Mn, Fe, Co, Ga or Al and other stable (+3) cations; and X may be O.

Composition having delafossite structure 200 may be used in the method for producing a TWC in FIG. 3.

FIG. 3 is a flowchart of method for producing a TWC 300, where at least a portion of the palladium used is stabilized in the formal oxidation state of (+1). First, substrate 302 may go through wash-coat application 304, by suitable methods known in the art, as a support material. Afterwards, a double impregnation may be applied over the wash-coat. A first impregnation 306 may be applied, by suitable methods known in the art, and then may go through first drying 308 step at room or evaluated temperatures to at least 80% drying, and a first firing 310 step at a temperature between about 400° C. and about 700° C. A second impregnation 312 may be applied, by suitable methods known in the art, over the layer produced after drying the first impregnation 306. Second impregnation 312 may then go through second drying 314 step at room or evaluated temperatures to at least 80% drying, and a second firing 316 step at a temperature between about 400° C. and about 700° C. As a final and optional step, an over-coat application 318 may be deposited, by suitable methods known in the art, on top of the layer formed after second drying 314 to produce the final catalyst coating 320 of Pd (+1) TWC, including wash-coat, first impregnation layer, second impregnation layer and over-coat. In other embodiments, a third drying step and third firing step may be added after over-coat application 318, if desired.

Substrate 302 may be a structure that exposes the maximum surface area of catalyst to an exhaust stream, while also minimizing the amount of catalyst required. Substrate 302 may be a honeycomb structure with a cell density of about 50 $inch^{-2}$ to about 1200 $inch^{-2}$ produced with ceramic supports made from cordierite, mullite, or similar temperature resistant materials.

Suitable compounds for the wash-coat application 304 may be of about 20% wt to about 80% wt of thermally stable high surface area oxides, such as $Al_2O_3$, $Al_2O_3/SiO_2$, $ZrO_2$, plus about 20% wt to about 80% wt of oxygen storage materials (OSM), such as lanthanide doped $CeO_2$—$ZrO_2$ (ceria zirconium oxides). Oxygen storage component may be about 20% wt to about 80% wt of the wash-coat and a palladium component in an amount of about 1 g/ft³ to about 100 g/ft³ of palladium, where the palladium component is substantially the only platinum group metal component.

For first impregnation 306 water soluble compounds, such as ammonium niobate oxalate, compatible with titanium (IV) oxysulfate hydrate, to form the first impregnation 306 solution, where second impregnation 312 may be applied as a palladium salt mixed with $Ca(NO_3)_2$. These two solutions may be combined as a single impregnation depending on the concentration, if complexing agents, such as EDTA, are used to prevent precipitation. Suitable compounds for second impregnation 312 may include a mixture of ammonium niobate oxalate and titanium (IV) oxysulfate hydrate The disclosed compounds may enable the production of TWCs that may be employed at moderate temperatures below about 900° C.

Figure 4:
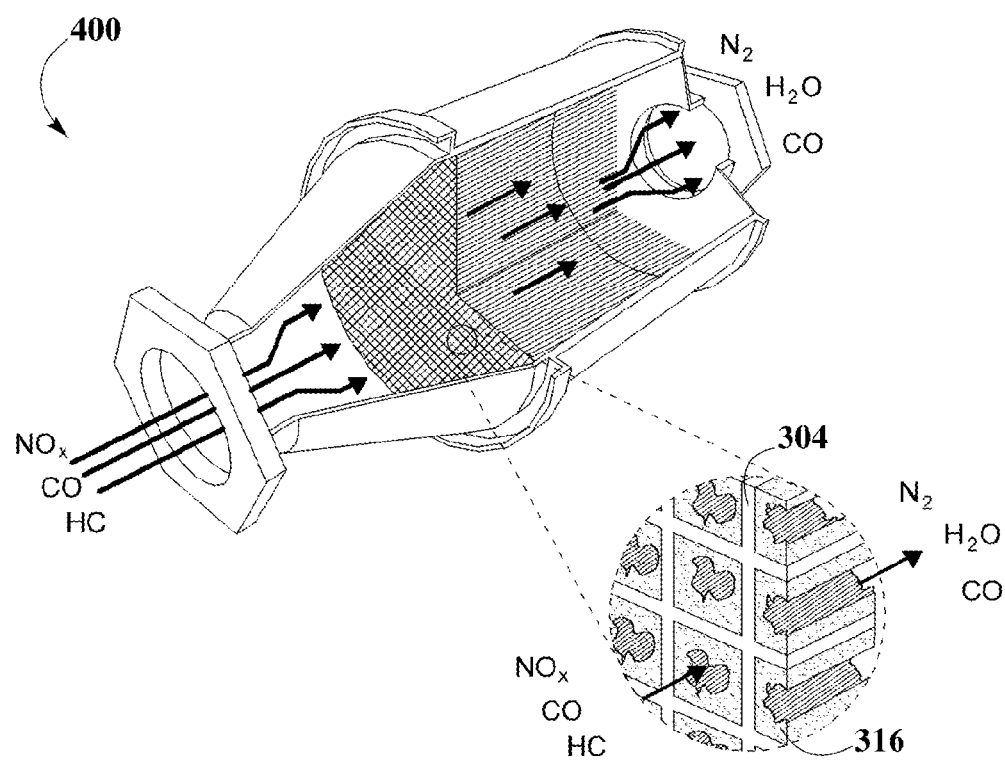
FIG. 4 illustrates a Pd (+1) TWC, according to an embodiment.

FIG. 4 illustrates Pd (+1) TWC 400, which may include a wash-coat, a first impregnation layer formed on the wash-coat, a second impregnation layer formed on the first impregnation layer, and an over-coat formed on the second impregnation layer. The wash-coat contains temperature stable high surface area oxides and OSMs. The first impregnation layer may include water soluble compounds, which when heated convert to oxides. The second impregnation layer and the over-coat may include a Pd compound in an amount of about 1 g/ft³ to about 100 g/ft³ of palladium, where the palladium component may be substantially the only platinum group metal component.

Suitable OSMs may include lanthanide doped $CeO_2$ or a mixed oxide containing cerium, e.g. a Ln/Ce/Zr mixed oxide.

Suitable $Pd^{1+}$ compounds may have perovskite or delafossite structures. Perovskite structure 100 may be denoted as $A^{x+}B^{y+}O_3$. Where A may be $Pd^{1+}$, $Ca^{2+}$; B may be Nb, Ta, Ti, Zr, Mn; and the formal charge of A may be lower than the formal charge of B. Delafossite structure 200 may be denoted as $Pd^{1+}XO_2$, where X may include the elements Sc, Cr, Mn, Fe, Co, Ga, or Al in the formal oxidation state of (III).

In one embodiment, the catalyst article exhibits improved performance in the reduction of nitrogen oxides relative to known palladium-only TWCs, and is effective to convert hydrocarbons, carbon monoxides, and nitrogen oxides to water, carbon dioxide and nitrogen, respectively, in an exhaust stream.

As a competitive reference, a Ba, Ce, Pd Mixed-Phase Catalyst (MPC) may be made with the same supports as the following embodiments. A wash-coat, of approximately 180 grams of support oxides per liter of substrate 302, may include about 40% wt of lanthanide dope-ceria-zirconia oxide and about 60% wt lanthanide stabilized aluminum oxide. The wash-coat may be impregnated with a Pd catalyst with 0.100 moles of Pd per liter of substrate.

In another embodiment, Pd (+1) TWC 400 may include impregnation composition A, where impregnation composition A may include a first impregnation 306 of about 0.0100 moles of Nb (oxalate) per liter of substrate 302 and about 0.0100 moles of Ti (sulfate) per liter of substrate 302, and a second impregnation 312 of about 0.0100 moles of Pd (nitrate) per liter of substrate 302 and about 0.0100 moles of Ca (nitrate) per liter of substrate 302.

In yet another embodiment, Pd (+1) TWC 400 may include impregnation composition B, where impregnation composition B may include a first impregnation 306 of about 0.0100 moles of Nb (oxalate) per litter of substrate 302 and 0.0300 moles of Ti (sulfate) per litter of substrate 302, and a second impregnation 312 of about 0.0100 moles of Pd (nitrate) per litter of substrate 302 and about 0.0300 moles of Ca (nitrate) per litter of substrate 302.

According to various embodiments, impregnation composition A and impregnation composition B may be applied over a wash-coat, of about 180 grams of support oxides per liter of substrate 302, that may include about 40% wt of lanthanide dope-ceria-zirconia oxide and about 60% wt lanthanide stabilized aluminum oxide.

Figure 5:
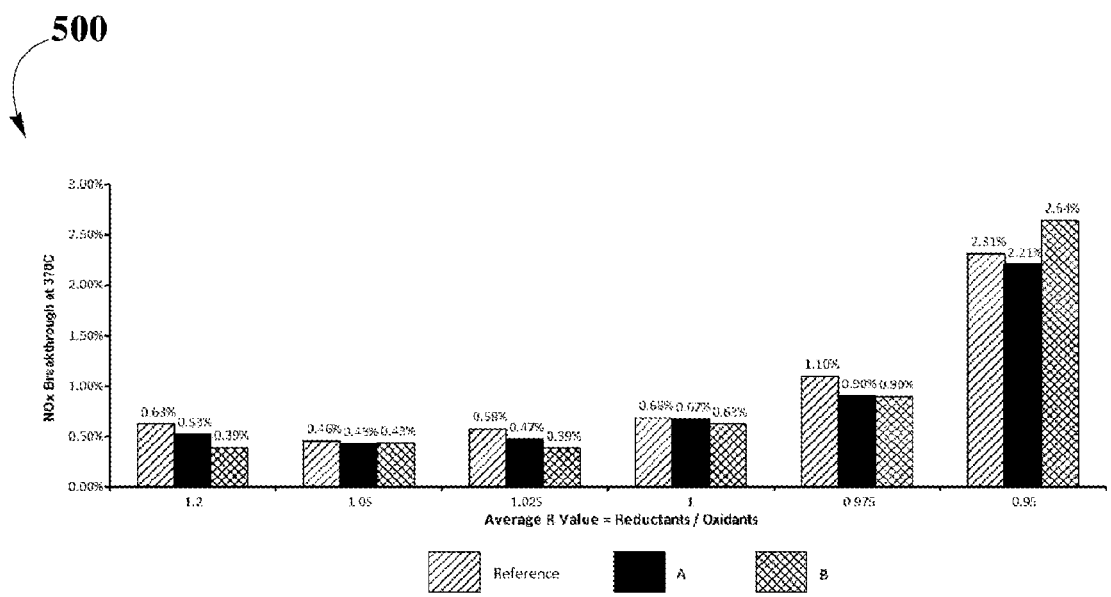
FIG. 5 shows the test results of disclosed TWC with $Pd^{1+}$, according to various embodiments.

FIG. 5 shows test results 500 of Pd (+1) TWC 400, according to various embodiments. FIG. 5 describes the behavior of the gas mix when introduced in Pd (+1) TWC 400. The test was conducted under controlled conditions, where the Pd (+1) TWC 400 was aged for 800 C 20 Hr with simulated exhaust gas, at a space velocity of 12,000 Hr−1, to stimulate a portion of full life aging of a under-floor catalyst. The simulated exhaust included fuel-cut and rich events.

According to an embodiment, the gas mix composition may include 8,000 ppm of CO, 2,000 ppm of $H_2$, 1000 ppm of NO, 400 ppm $C_3H_6$, 100 ppm of $C_3H_8$, 10% of $H_2O$, and 10% of $CO_2$. The quantity of $O_2$ in the gas mix may be oscillated to represent the three-way condition of the control loop in a car, where the Air-fuel ratio oscillates between rich and lean conditions.

Test results 500 shows the NOx breakthrough measured at about 370° C., in percentage, in the "y" axis and the values for each embodiment at different R values in the "x" axis. R may be a value defined as the product of dividing the moles of oxygen that need to be consumed for the gas to become $CO_2$ by the moles of oxygen that could be released, resulting in average values of 1.2, 1.05, 1.025, 1, 0.975, and 0.95. When R equals 1, it may be considered as a stoichiometric reaction.

NOx breakthrough may be the amount of emissions that passes through the catalyst as a percentage of what is introduced into the catalyst. Accordingly, at different R values, impregnation composition A and B, as well as the competitive reference, may have the following NOx breakthrough:

TABLE 1

| NOx Breakthrough According to Average R Value. | | | |
|---|---|---|---|
| | NOx Breakthrough at 370 C. | | |
| Average R value | Reference | A | B |
| 1.2 | 0.63% | 0.53% | 0.39% |
| 1.05 | 0.46% | 0.43% | 0.43% |
| 1.025 | 0.58% | 0.47% | 0.39% |
| 1.0 | 0.68% | 0.67% | 0.63% |
| 0.975 | 1.10% | 0.90% | 0.90% |
| 0.95 | 2.31% | 2.21% | 2.64% |

EXAMPLES

Example #1 is another embodiment of Pd (+1) TWC 400, where the structure of the $Pd^{1+}$ described in FIG. 2 is included on the second impregnation layer and the over-coat. Suitable compounds for perovskite structure 100 may be denoted as $ABX_3$. Where A may include $Pd^{1+}$, $Pd^{1+}/Ca$, La; B may include Ti/Nb, Nb, Zr, Mn, Ta, V, Ti, W and mixture thereof and other stable (+5) oxides; and X may be $O_3$. Pd (+1) TWC 400 may exhibit improved durability and performance relative to known palladium-only TWCs, and may be effective to convert hydrocarbons, carbon monoxides and nitrogen oxides into water, carbon dioxide and nitrogen, respectively, in an exhaust stream from any engine that would utilize a TWC.

Example #2 is another embodiment of Pd (+1) TWC 400, where the structure of the $Pd^{1+}$ described in FIG. 3 is included on the second impregnation layer and the over-coat. Suitable compounds for delafossite structure 200 may be configured as $PdXO_2$ where X may be Sc, Cr, Mn, Fe, Co, Ga, Al, Ca. Pd (+1) TWC 400 may exhibit improved durability and performance relative to known palladium-only TWCs, and may be effective to convert hydrocarbons, carbon monoxides and nitrogen oxides into water, carbon dioxide and nitrogen, respectively, in an exhaust stream from any engine that would utilize a TWC.

Example #3 is another embodiment of Pd (+1) TWC 400, where Pd (+1) TWC 400 may be mounted directly on the engine exhaust manifold of a modern car. In this position the catalyst may be rapidly heated when the engine is started with a suitable start-up strategy. Because it runs hotter, less quantity of the PGM may be required than otherwise would be the case.

It should be understood that the present disclosure is not limited in its application to the details of construction and arrangements of the components set forth here. The present disclosure is capable of other embodiments and of being practiced or carried out in various ways. Variations and modifications of the foregoing are within the scope of the present disclosure. It also being understood that the invention disclosed and defined here extends to all alternative combinations of two or more of the individual features mentioned or evident from the text and/or drawings. All of these different combinations constitute various alternative aspects of the present disclosure. Thus, the scope of the invention should be determined by the appended claims and their legal equivalents, and not by the examples given.

What is claimed is:

1. A catalyst system, comprising:
   a substrate; and
   a washcoat deposited on the substrate, comprising at least one metal oxide carrier, and at least one catalyst; and
   wherein the at least one catalyst comprises at least one perovskite structured compound having the formula $ABO_3$ wherein A is selected from the group consisting of Palladium (I), Palladium (I)/Calcium, Lanthanum and combinations thereof, and B is selected from the group consisting of Titanium/Niobium, Niobium, Zirconium, Manganese, Tantalum, Vanadium, Titanium, Tungsten and combinations thereof; and
   wherein the washcoat further comprises at least one oxygen storage material.

2. The catalyst system of claim 1, wherein A is La.

3. The catalyst system of claim 1, wherein B comprises at least one stable (+5) cation, and wherein the at least one stable (+5) cation is selected from the group consisting of Niobium (V), Vanadium (V), Tantalum (V) and combinations thereof.

4. The catalyst system of claim 1, wherein the at least one perovskite structured compound has the formula $Pd^{1+}_{0.5} Ca^{2+}_{0.5} Ti^{4+}_{0.50} Nb^{5+}_{0.5} O_3$.

5. The catalyst system of claim 1, wherein the at least one perovskite structured compound has the formula $Pd^{1+}_{u} Ca^{2+}_{v} D^{4+}_{w} E^{5+}_{x} O_{y}$, wherein $u+v=1$, $w+x=1$, y is from 2.7 to 3, and each of D and E are elements having a stable formal charge of (IV) and (V).

6. The catalyst system of claim 5, wherein $y=3$.

7. The catalytic system of claim 6, wherein $u*1+v*2+w*4+x*5=6$.

8. The catalyst system of claim 1, wherein the oxygen storage material is about 20% to about 80% by weight of the washcoat.

9. The catalyst system of claim 1, wherein the at least one perovskite structured compound comprises about 1 $g/ft^3$ to about 100 $g/ft^3$ of Pd.

10. The catalyst system of claim 1, wherein the substrate comprises a honeycomb structure.

11. The catalyst system of claim 1, wherein the substrate comprises at least one ceramic material.

12. The catalyst system of claim 11, wherein the at least one ceramic material is selected from the group consisting of cordierite, mullite, SiC, SiN, and combinations thereof.

13. The catalyst system of claim 1, wherein the substrate is shock resistant.

14. The catalyst system of claim 1, wherein the substrate is thermally resistant.

15. The catalyst system of claim 1, wherein at least a portion of the substrate comprises three-dimensional support for the washcoat.

16. A catalyst system, comprising:
    a substrate; and
    a washcoat deposited on the substrate, comprising at least one metal oxide carrier, and at least one catalyst; and
    wherein the at least one catalyst comprises at least one delafossite structured compound having the formula $ABO_2$ wherein A is Palladium (I) and B is selected from the group consisting of Scandium, Chromium, Manganese, Iron, Cobalt, Gallium, Aluminum and combinations thereof.

17. The catalyst system of claim 16, wherein B comprises at least one stable (+3) cation, and wherein the at least one stable (+3) cation is selected from the group consisting of Scandium (III), Chromium (III), Manganese (III), Iron (III), Cobalt (III), Gallium (III), Aluminum (III) and combinations thereof.

18. The catalytic system of claim 16, further comprising a first impregnation layer wherein the first impregnation layer is heated to about 400° C. to about 700° C.

19. The catalytic system of claim 16, further comprising a second impregnation layer wherein the second impregnation layer is heated to about 400° C. to about 700° C.

20. The catalytic system of claim 16, further comprising an overcoat.

* * * * *